(12) United States Patent
Mizuide et al.

(10) Patent No.: US 6,174,928 B1
(45) Date of Patent: Jan. 16, 2001

(54) PROCESS FOR PRODUCING FLUORINATED OLIGOMER HAVING COOH GROUPS AT BOTH ENDS

(75) Inventors: Fumiyo Mizuide, Iwaki; Haruyoshi Tatsu, Kitaibaraki, both of (JP); Sergey Vasilievich Sokolov, St. Petersburg (RU); Michail Vasiliyevich Zhuravlev, St. Petersburg (RU); Igor Vladimirovich Kokotin, St. Petersburg (RU); Olga Viktorinovna Blagodatova, St. Petersburg (RU)

(73) Assignee: Nippon Mektron, Limited (JP)

( * ) Notice: Under 35 U.S.C. 154(b), the term of this patent shall be extended for 0 days.

(21) Appl. No.: 09/277,453

(22) Filed: Mar. 26, 1999

(30) Foreign Application Priority Data

May 14, 1998 (JP) .................................. 10-150743

(51) Int. Cl.$^7$ ..................................... C08J 11/10
(52) U.S. Cl. ........................... 521/46; 525/344; 525/345; 525/383; 525/387; 525/938; 528/489; 554/138; 562/513; 562/523; 562/541; 570/152; 570/218
(58) Field of Search ................................ 521/40.5, 41, 46; 525/326.1, 326.2, 330.7, 343, 344, 345, 383, 387, 938; 528/480, 488, 489; 554/124, 132, 138; 562/509, 512, 513, 523, 541; 570/123, 125, 134, 152, 181, 218

(56) References Cited

U.S. PATENT DOCUMENTS

| | | | |
|---|---|---|---|
| 3,291,761 | | 12/1966 | Griffin . |
| 3,793,235 | * | 2/1974 | Goebel, Jr. ............................. 521/46 |
| 3,852,223 | * | 12/1974 | Bohme et al. .......................... 521/46 |
| 3,972,842 | * | 8/1976 | Markham ................................ 521/46 |
| 4,200,711 | * | 4/1980 | Onoue et al. ........................... 525/387 |
| 4,294,943 | * | 10/1981 | Onoue et al. ........................... 525/358 |
| 4,305,850 | * | 12/1981 | Watabe et al. .......................... 585/241 |
| 4,585,801 | * | 4/1986 | Burney, Jr. et al. ..................... 521/46 |
| 4,629,780 | * | 12/1986 | Schoenhard ............................ 528/488 |
| 5,037,892 | * | 8/1991 | Hogt et al. ............................. 525/298 |
| 5,157,087 | * | 10/1992 | Hogt et al. ............................. 525/298 |
| 5,274,140 | * | 12/1993 | Venturello et al. ..................... 549/531 |
| 5,438,078 | * | 8/1995 | Butcher, Jr. et al. .................... 521/41 |
| 5,731,460 | * | 3/1998 | Johnstone et al. ..................... 562/408 |
| 5,770,633 | * | 6/1998 | Naraki et al. ......................... 521/43 |

FOREIGN PATENT DOCUMENTS 59-217734  12/1984  (JP) .
59-217735  12/1984  (JP) .

OTHER PUBLICATIONS

Kautschuk & Gumml, Kunststoffe 45. Jahrgang, Jahrgang, Nr. Sep. 1992, p. 742.

* cited by examiner

*Primary Examiner*—Jan H. Silbaugh
*Assistant Examiner*—Kenneth M. Jones
(74) *Attorney, Agent, or Firm*—Baker & Daniels

(57) ABSTRACT

A fluorinated oligomer having COOH groups at both end and a $\rho_{50°}$ value of 1,000 to 10,000 is produced by swelling a fluorine rubber crosslinking product in an organic solvent, followed by decomposition in the presence of a base and a peroxide. The obtained fluorinated oligomer is soluble in solvent and thus easy to separate from fillers, etc., and can be effectively used as a chain-elongating agent for epoxy resin, isocyanate resin, oxazoline resin, etc.

9 Claims, No Drawings

PROCESS FOR PRODUCING FLUORINATED OLIGOMER HAVING COOH GROUPS AT BOTH ENDS

BACKGROUND OF THE INVENTION

1. Field of the Invention

The present invention relates to a fluorinated oligomer having COOH groups at both end, a process for producing the same and a composition comprising the same together with epoxy resin, and more particularly to a fluorinated oligomer having COOH groups at both ends, obtained by decomposition of fluorine rubber crosslinking products, a process for producing the same and a composition comprising the same with epoxy resin.

2. Description of Related Art

Utilization of ordinary rubber wastes by regeneration has no positive cost merits, but utilization of vulcanized fluorine rubber wastes, typical of which are flashes generated during the rubber vulcanization-molding, is an important task from the viewpoint of cost reduction, because the high raw material cost of fluorine rubber.

So far, the cross-linked, vulcanized fluorine rubber has been regenerated by mechanically pulverizing flashes, waste pieces, etc. of the crosslinked, vulcanized fluorine rubber, followed by plasticing, or by further treatment with nitric acid, potassium permanganate or various amines [JP-A 59-217734 and 59-217735; U.S. Pat. No. 3,291,761; DP-A 2 360 927 and 2 420 993; Kautschuk+Gummel·Kunststoffe 23. Jahrgang, Heft March 1976, page 218 and ibid. 45. Jahrgang, Nr. September 1992, page 742; Proiz-vo Shin, Rezinotekhn; Asbestotekhn. Izdfii (Moskva) 1979,vol. 6, page 7]. The regenerated fluorine rubber is mixed with virgin rubber (fresh rubber) as a filler and is used as a kind of extender.

However, the crosslinking structure of the crosslinked, vulcanized fluorine rubber must be decomposed to obtain the regenerated fluorine rubber from the crosslinked, vulcanized fluorine rubber. Furthermore, the vinylidene fluoride structure of vinylidene fluoride copolymer usually used in the fluorine rubber is actually hard to decompose under basic conditions or the crosslinking structure based on polyhydroxy compound (polyol) is not so decomposed even with a strong acid such as nitric acid, etc. as to regenerate and isolate the rubber moiety.

Still furthermore, the crosslinked, vulcanized fluorine rubber contains a filler in almost all the cases, and it is desirable to obtain regenerated fluorine rubber completely freed from such a filler. It is pointed out that the above-mentioned regeneration procedure is not always applicable, depending on the crosslinking system used for the formation of crosslinked, vulcanized fluorine rubber, and thus is not generally applicable.

On the other hand, U.S. Pat. No. 3,291,761 discloses a process for reclaiming revulcanizable polymers by dehydrogenfluoride reaction an amine-vulcanized vinylidene fluoride-hexafluoropropene copolymer and subjecting the resulting double bonds to oxidative decomposition, using $KMnO_4$. Antipollution countermeasures are indispensable to the process with respect to removal of heavy metal Mn.

SUMMARY OF THE INVENTION

An object of the present invention is to provide an oligomer obtained by decomposition of fluorine rubber crosslinking products, the oligomer being soluble in solvents and thus easy to separate from fillers, etc. and effectively utilizable as a chain-elongating agent for epoxy resin, isocyanate resin, oxazoline resin, etc.

The object of the present invention can be attained by a fluorinated oligomer having COOH groups at both ends and a $\rho_{50°}$ value of about 100 to about 10,000. Such a fluorinated oligomer having COOH groups at both ends can be produced by swelling fluorine rubber crosslinking products in an organic solvent, followed by decomposition in the presence of a base and a peroxide.

DETAILED DESCRIPTION OF THE INVENTION

Fluorine rubber crosslinking products to be decomposed according to the present invention are wastes such as flushes, scraps, molding failures, etc. resulting from vulcanization molding using polyol, amine, peroxide, or the like. Fluorine rubber to be vulcanization-molded includes, for example, copolymers of vinylidene fluoride with other fluorine-containing olefin or olefin such as at least one of tetrafluoroethylene, hexafluoropropene, chlorotrifluoroethylene, pentafluoropropene, perfluoro(alkyl vinyl ether), propylene, etc., typically such vinylidene fluoride copolymers as vinylidene fluoride-hexafluoropropene copolymer, vinylidene fluoride-hexafluoro-propene-tetrafluoroethylene terpolymer, vinylidene fluoride-tetrafluoroethylene-propylene terpolymer, vinylidene fluoride-perfluoro(methyl vinyl ether)-copolymer, vinylidene fluoride-tetrafluoroethylene-perfluoro(methyl vinyl ether) terpolymer, etc. Besides the above-mentioned copolymers, tetrafluoroethylene copolymers such as tetrafluoroethylene-propylene copolymer, tetrafluoroethylene-perfluoro(methyl vinyl ether) copolymer, tetrafluoroethylene-perfluoro(methyl vinyl ether)-ethylene terpolymer, etc. can be used. The copolymers can also include copolymers with Br- and/or I-containing compounds, or monomers having such a crosslinkable group as a nitrile group, a glycidyl group, a hydroxyalkyl group, a perfluorophenyl group, etc.

These fluorine rubber crosslinking products are dipped in an organic solvent for thorough swelling of the entirety over one day or more and then are subjected to decomposition treatment. Any organic solvent can be used for this purpose, so long as it can swell the fluorine rubber crosslinking products, and such a solvent includes, for examples, ketones, amides (i.e. dimethylformamide, dimethylacetamide, etc.), sulfur-containing compounds (i.e. dimethyl sulfoxide, sulfolane, etc.), alcohols, lower fatty acids, esters, halogen-containing compounds (i.e. trichlorotrifluoroethane, hexafluoroisopropanol, trifluoroethanol, trichloroacetic acid, etc.), or the like.

Decomposition treatment in such a swollen state is carried out in the presence of a base and a peroxide. The base includes, for example, hydroxides, carbonates or organic acid salts of alkali metals, tertiary amines, tertiary phosphines, etc. The peroxide includes, for example, $H_2O_2$, persulfates, peracetic acid, organic peroxides, organic hydroperoxides, etc. $H_2O_2$ is most preferable from the economical viewpoint. Addition of the base and the peroxide can be carried out in the order of the peroxide to the base each all in one run or in divided portions.

For the swelling in an organic solvent, it is preferable to use a phase transfer catalyst, typically, a quaternary onium salt such as a quaternary ammonium salt or a quaternary phosphonium salt, particularly in case of pulverized fluorine rubber crosslinking products as dispersed in a latex state, thereby contributing to an increase in the rate of decomposition reaction.

A quaternary ammonium salt or a quaternary phosphonium salt represented by the following general formula can be used as a quaternary onium salt:

$(R_1R_2R_3R_4N)^+X^-$

$(R_1R_2R_3R_4P)^+X^-$ where $R_1$ to $R_4$ are each an alkyl group having 1 to 25 carbon atoms, an alkoxy group, an aryl group, an alkylaryl group, an aralkyl group or a polyoxyalkylene group, or two or three of which may form a heterocyclic structure together with N or P; and $X^-$ is an anion such as $Cl^-$, $Br^-$, $I^-$, $HSO_4^-$, $H_2PO_4^-$, $RCOO^-$, $ROSO_2^-$, $RSO^-$, $ROPO_2H^-$, $CO_3^{--}$, etc.

Specifically, the quaternary onium salt includes, for example, quaternary ammonium salts such as tetraethylammonium bromide, tetrabutylammonium chloride, tetrabutylammonium bromide, tetrabutylammonium iodide, n-dodecyltrimethylammonium bromide, cetyldimethylbenzylammonium chloride, methylcetyldibenzylammonium bromide, cetyldimethylethylammonium bromide, octadecyltrimethyl ammonium bromide, cetylpyridinium chloride, cetylpyridinium bromide, cetylpyridinium iodide, cetylpyridinium sulfate, 1-benzylpyridinium chloride, 1-benzyl-3, 5-dimethylpyridinium chloride, 1-benzyl-4-phenylpyridinium chloride, 1,4-dibenzylpyridinium chloride, 1-benzyl-4-(pyrrolidinyl)-pyridinium chloride, 1-benzyl-4-pyridinopyridinium chloride, tetraethylammonium acetate, trimethylbenzylammonium benzoate, trimethylbenzylammonium-p-toluene sulfonate, trimethylbenzylammonium borate, 8-benzyl-1,8-diazabicydo[5,4,0]-undec-7-enium chloride, 1,8-diazabicyclo-[5,4,0]-undecen-7-methylammonium methosulfate, 5-benzyl-1,5-diazabicyclo[4,3,0]-5-nonenium chloride, 5-benzyl-1,5-diazabicyclo-[4,3,0]-5-nonenium bromide, 5-benzyl-1,5-diazabicyclo[4,3,0]-5-nonenium tetrafluoroborate, 5-benzyl-1,5-diazabicyclo[4,3,0]-5-nonenium hexafluorophosphate, etc., and quaternary phosphonium salts such as tetraphenylphosphonium chloride, triphenylbenzylphosphonium chloride, triphenylbenzylphosphonium bromide, triphenylmethoxymethylphosphonium chloride, triphenylmethylcarbonylmethylphosphonium chloride, triphenylethoxycarbonylmethylphosphonium chloride, trioctylbenzylphosphonium chloride, trioctylmethylphosphonium bromide, trioctylethylphosphonium acetate, trioctylethylphosphonium dimethyl phosphate, tetraoctylphosphonium chloride, cetyldimethylbenzylphosphonium chloride, etc.

Decomposition temperature is not particularly limited in the decomposition treatment. The decomposition treatment is carried out at a temperature of usually about 0 to about 100° C., preferably about 10° to about 30° C. from the viewpoint of exothermic control. Molecular weight and acid value of the decomposition product can be adjusted as desired by selecting a proportion of double bonds to be introduced by the base.

For example, in case of vinylidene fluoride-hexafluoropropene copolymer, it seems that the decomposition reactions take place according to the following reaction mechanism:

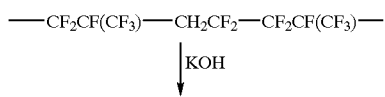

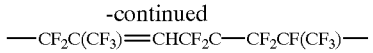

—$CF_2C(CF_3)$=$CHCF_2C$—$CF_2CF(CF_3)$—

$\downarrow H_2O_2$

—$CF_2COCF_3$ + $HCOCF_2CF_2CF(CF_3)$—

$\downarrow$

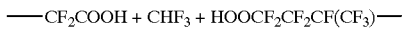

—$CF_2COOH$ + $CHF_3$ + $HOOCF_2CF_2CF(CF_3)$—

The decomposition reaction mixture is phase-separated with strong hydrochloric acid, and the coarse filler component is at first filtered off as filter cakes through a filter. The washing solution resulting from washing of the filter cakes, together with the filtrate, is charged into a large amount of water to conduct precipitation, followed by vigorous stirring for a long time. Such operations are repeated three times for reprecipitation. The resulting oily matters are transferred onto a glass dish, etc., spreaded thereon, and dried at about 65° C. for about 3 days, whereby a fluorinated oligomer having COOH groups at both ends can be obtained as a oily viscous liquid.

The thus obtained fluorinated oligomer having COOH groups at both ends has a $\rho_{50°}$ value of about 100 to about 10,000, preferably about 200 to about 2,000, as measured by a Brook field type viscometer, and can be used as a chain-elongating agent for epoxy resin, isocyanate resin or oxazoline resin, preferably for epoxy resin.

Any one of glycidyl ether type, glycidyl ester type, glycidyl amine type, alicyclic type, etc. can be used for the epoxy resin. For particularly preferable glycidyl ether type epoxy resin, any one of bifunctional types of aromatic series such as bisphenol A type, bisphenol S type, brominated bisphenol A type, hydrogenated bisphenol F type, bisphenol F type, bisphenol AF type, biphenyl type, naphthalene type, fluorene type, etc. or of aliphatic series such as ethyleneglycol type, etc. and multifunctional types such as phenol novolak type, orthocresol novolak type, DPP novolak type, trishydroxyphenylmethane type, tetraphenylolethane type, etc. can be used as the epoxy resin.

The fluorinated oligomer having COOH groups at both ends and the epoxy resin can be used in a ratio of the former to the latter of generally 100 parts by weight: about 10 to about 50 parts by weight, preferably about 10 to about 20 parts by weight, though depending upon the epoxy equivalent weight. A mixture of these two components is heated at about 20° to about 40° C. for about 3 to about 60 minutes until appearance of a sign of elasticity, then placed into a mold heated to about 50° to about 70° C., secured as sandwiched between fluorinated resin films by screws, then heated at about 50° to about 150° C. for about 0.1 to about 2 hours and postcured at room temperature for about 1 to about 30 days or at about 50° to about 150° C. for about 0.1 to about 2 hours.

The curing products are distinguished not only in vulcanization physical properties such as 100% modulus, tensile strength, elongation, elongational strain, etc., but also in solvent resistance, particularly hydrocarbon resistance.

The present invention provides an oligomer having COOH groups at both ends by decomposition of fluorine rubber crosslinking products, the oligomer is soluble in solvents and thus can be easily separated from fillers, etc. contained in the crosslinking products, and also can be used as a chain-elongating agent for epoxy resin, isocyanate resin, oxazoline resin, etc. with effective use for a solvent-resistant sealant, adhesive, coating material, etc.

PREFERRED EMBODIMENTS OF THE INVENTION

The present invention will be described in detail below, referring to Examples.

EXAMPLE 1

Polyol-crosslinked fluorine rubber crosslinking products (fluorine rubber content: 83.3% by weight) obtained by press vulcanizing a mixture consisting of 100 parts by weight of vinylidene fluoride-hexafluoropropene copolymer (molar ratio=75:25), 10 parts by weight of MT carbon black and 10.1 parts by weight of other additives (magnesium oxide, calcium hydroxide, vulcanizing agent of diol series, etc.) were mechanically pulverized.

450 g of the pulverized fluorine rubber crosslinking products, 13.9 g of benzyltriethylammonium chloride and 2550 g of acetone were charged into a glass reaction vessel having a capacity of 5,500 ml, provided with a dropping funnel, a stainless steel stirring vanes, a thermometer and a gas vent pipe, left for standing at about 20° C. for 24 hours, and then cooled to 14° C. over a water bath, followed by dropwise addition of 288.5 g of 33% $H_2O_2$ over 5 minutes and successively an aqueous 45% KOH solution (120 g in terms of KOH) over 25 minutes. Temperature increase was continued over 60 minutes with gas generation. Then, the reaction mixture was kept at about 20° to about 25° C. for 6 hours and then left for standing at room temperature overnight.

The reaction mixture with no phase separation was acidified to pH2 by 130 ml of strong hydrochloric acid and passed through a fine metallic filter for separation into a rough filler component and a rubber component. The filler component remaining solid matters on the filter was washed with 500 g of acetone. The washing solution resulting from the washing, together with the filtrate, was added to a 4-fold volume of water, followed by vigorous stirring for 6 hours. The resulting precipitates were repeatedly subjected to reprecipitation treatment three times, using an aqueous 50 wt. % acetone solution. The first purification was carried out by adding strong hydrochloric acid to the aqueous 50 wt. % acetone solution, thereby acidifying it to pH2, and next purification was carried out by transferring the acidified, wet materials onto a glass dish and drying the materials in a thinly spread liquid state at about 60° to about 65° C. under a reduced pressure of 5 mmHg for 70 hours, thereby bringing the materials into a constant weight.

234 g of black viscous liquid ($\eta_{50°}$=285 Pa•s) was thereby obtained and was found to be a mixture consisting of 99% by weight of oligomer ($\eta_{50°}$=250 Pa•s) and 1% by weight of filler, by infrared absorption spectral ratio ($I_{1760}/I_{1450}$).

$^{19}$F-NMR(CDCl$_3$, CFCl$_3$, δ): −115 to 120 ppm (−CF$_2$COOH)

$^1$H-NMR(CDCl$_3$, TMS, δ): 7.6 to 7.8 ppm (—COOH)

EXAMPLE 2

In Example 1, after cooling to 14° C. over the water bath, the aqueous 45 wt. % KOH solution (60 g in terms of KOH) was dropwise added to the mixture, followed by stirring at 20° C. for 6 hours and leaving it for standing at room temperature for 18 hours. Then, 288.5 g of 33% $H_2O_2$ was dropwise added thereto over 5 minutes and then the aqueous 45 wt. % KOH solution (69 g in terms of KOH) was dropwise added thereto over 20 minutes. Heat generation and gas generation were observed upon the dropwise addition of $H_2O_2$ and heat generation was observed upon the dropwise addition of the aqueous KOH solution. Separation and purification were then carried out in the same manner as in Example 1.

283.5 g of black viscous liquid ($\eta_{50°}$=8300 Pa•s) was thereby obtained, and was found to be a mixture consisting of 87% by weight of oligomer ($\eta_{50°}$=3460 Pa•s) and 13% by weight of filler.

EXAMPLE 3

In Example 1, a Kapron filter was used in place of the metallic filter, whereby 247.5 g of a black viscous liquid ($\eta_{50°}$=620 Pa•s) was obtained and found to be a mixture consisting of 93% by weight of oligomer ($\eta_{50°}$=323 Pa•s) and 7% by weight of filler.

EXAMPLE 4

In Example 1, after cooling at 14° C. over the water bath, 96.2 g of 33% $H_2O_2$ was dropwise added to the mixture over 2 minutes and then an aqueous 40 wt. % KOH solution (40 g in terms of KOH) was dropwise added thereto over 10 minutes. Temperature elevation by +8° C. and gas generation were observed. Then, dropwise addition of the same amounts of $H_2O_2$ and aqueous 40 wt. % KOH solution was carried out twice after 1.5 hours and after 3 hours.

391.5 g of a black viscous liquid ($\eta_{50°}$=3100 Pa•s) was obtained and found to be a mixture consisting of 81% by weight of oligomer ($\eta_{50°}$=445 Pa•s) and 19% by weight of filler.

EXAMPLE 5

In Example 4, pulverized, polyol-crosslinked fluorine rubber crosslinking products (fluorine rubber content: 74.6% by weight) obtained by press vulcanizing a mixture consisting of 100 parts by weight of vinylidene fluoride-hexafluoropropene copolymer (molar ratio=80:20), 20 parts by weight of MT carbon black and 14 parts by weight of other additives (magnesium oxide, calcium hydroxide, bisphenol AF, benzyltriphenylphosphonium chloride, etc.) were used as the pulverized fluorine rubber crosslinking products. The amount of benzyltriethylammonium chloride was changed to 12.4 g, and 258.4 g of sum total of 33% $H_2O_2$ and 107.4 g (in terms of KOH) of sum total of the aqueous 40 wt. % KOH solution were dropwise added each in 3 divided portions to the mixture.

373.5 g of a black viscous liquid ($\eta_{50°}$=2590 Pa•s) was thereby obtained and found to be a mixture consisting of 67% by weight of oligomer ($\eta_{50°}$=255 Pa•s) and 33% by weight of filler.

EXAMPLE 6

In Example 4, pulverized, polyol-crosslinked fluorine rubber crosslinking products (fluorine rubber content: 74.6% by weight) obtained by press vulcanizing a mixture consisting of 100 parts by weight of vinylidene fluoride-hexafluoropropene copolymer (molar ratio=80:20), 35 parts by weight of white filler such as calcium silicate, etc., 10 parts by weight of Fe$_2$O$_3$ and 14 parts by weight of other additives (magnesium oxide, calcium hydroxide, bisphenol AF, benzyltriphenylphosphonium chloride, etc.) were used as the pulverized fluorine rubber crosslinking products. The amount of benzyltriethylammonium chloride was changed to 10.5 g, and 219.9 g of sum total of 33% $H_2O_2$ and 90.6 g (in terms of KOH) of the aqueous 40 wt. % KOH solution were dropwise added each in 3 divided portions to the mixture.

225 g of a dark brown viscous liquid ($\eta_{50°}$=2850 Pa•s) was thereby obtained and found to be a mixture consisting of 87% by weight of oligomer ($\eta_{50°}$=1750 Pa•s) and 13% by weight of filler.

EXAMPLE 7

In Example 6, the sum total of 33% $H_2O_2$ was changed to 435.8 g.

243 g of a dark brown viscous liquid ($\eta_{50°}$=410 Pa•s) was thereby obtained and found to be a mixture consisting of 98% by weight of oligomer ($\eta_{50°}$=430 Pa•s) and 2% by weight of filler.

EXAMPLE 8

In Example 7, the benzyltriethylammonium chloride was not used 252 g of a dark brown viscous liquid ($\eta_{50°}$340 Pa•s) was thereby obtained and found to be a mixture consisting of 97% by weight of oligomer ($\eta_{50°}$=325 Pa•s) and 3% by weight of filler.

As a result of measurements by infrared absorption spectrum, $^{19}F$-NMR and $^1H$-NMR, it was found that the viscous liquids obtained in the foregoing Examples 1 to 7 were all fluorinated oligomers each having COOH groups at both ends.

EXAMPLE 9

100 parts by weight of each of the fluorinated oligomers each having COOH groups at both ends obtained in Examples 1 to 7 were placed into glass or ceramic crucibles, respectively, to which a specific amount of epoxy resin (Yuka-Shell Epoxy product E-154, epoxy equivalent weight: 179) was added, followed by mixing with stirring over 10 minutes. Then, the crucibles were placed into a thermostat and heated for about 3 to about 60 minutes until appearance of a sign of elasticity. The individual mixtures in that state were placed into respective molds heated to about 60° C., and secured as sandwiched between fluorinated resin films by screws to prevent adhesion and attain flattening. The molds were placed into a thermostat of hot air circulation type and heated at 130° C. for one hour. Sheets (120 mm×60 mm×1 mm) were taken out of the molds and further heated at 130° C. for one hour.

From the sheets were cut out test pieces, 2 mm thickness in the direction perpendicular to the grain effect direction. Test pieces were subjected to measurements of vulcanization physical properties according to JIS K-6301. The results are shown in the following Table 1.

TABLE 1

| No. | Oligomer | Epoxy resin parts by weight) | Gellation time (min.) | 100% modulus (MPa) | Tensile strength (MPa) | Elongation (%) | Elongational strain (%) |
|---|---|---|---|---|---|---|---|
| 1 | Example 1 | 15.1 | 30 | 6.3 | 12.4 | 180 | 5 |
| 2 | Example 1 | 14.9 | 30 | 7.2 | 10.4 | 150 | 5 |
| 3 | Example 2 | 13.1 | 15 | 8.2 | 15.1 | 145 | 5 |
| 4 | Example 3 | 14.1 | 40 | 7.0 | 10.8 | 150 | 5 |
| 5 | Example 3 | 14.0 | 40 | 6.5 | 12.4 | 150 | 5 |
| 6 | Example 4 | 12.2 | 50 | 5.9 | 12.8 | 150 | 5 |
| 7 | Example 5 | 9.9 | 25 | 11.7 | 14.3 | 125 | 5 |
| 8 | Example 6 | 13.0 | 25 | 11.6 | 16.9 | 150 | 5 |
| 9 | Example 7 | 14.7 | 25 | 6.6 | 12.8 | 170 | 10 |

Remarks)
Gellation time: the time until the flow ability was lost by stirring was visually measured
Elongational strain: according to JIS K-6262 (100% elongation and recovery after 24 hours with its residual strain being measured at 23 ± 2° C.)

EXAMPLE 10

In No. 7 of Example 9, the amount of epoxy resin was changed and results as shown in the following Table 2 were obtained.

TABLE 2

| Epoxy resin (parts by weight) | Gellation time (min.) | 100% modulus (MPa) | Tensile strength (MPa) | Elongation (%) | Elongational strain (%) |
|---|---|---|---|---|---|
| 9.9 | 25 | 11.7 | 14.3 | 125 | 5 |
| 8.0 | 25 | 9.4 | 10.0 | 110 | 5 |
| 6.0 | 30 | 6.1 | 6.6 | 120 | 5 |
| — | — | — | 8.7 | 100 | 2 |

EXAMPLE 11

In Nos. 1 and 2 of Example 9, 15.0 parts by weight of epoxy resin was used, and heating temperature and heating time were changed, as shown in the following Table 3. Results as shown in the following Table 3 were obtained.

TABLE 3

| Heating conditions | 100% modulus (MPa) | Tensile strength (MPa) | Elongation (%) | Elongational strain (%) | −Δw |
|---|---|---|---|---|---|
| 130° C. for 1 hr −130° C. for 1 hr | 7.0 | 11.2 | 170 | 0 | |
| 130° C. for 1 hr −150° C. for 5 hrs | 4.1 | 5.0 | 120 | 5 | 1.4 |
| 130° C. for 1 hr −200° C. for 5 hrs | | 9.8 | 60 | 0 | 7.2 |
| 130° C. for 1 hr −room temp. for 34 days (as sandwiched between fluorinated resin films) | 3.5 | 9.0 | 210 | 5 | |
| 130° C. for 1 hr −room temp. for 34 days (in a state freed from the fluorinated resin films) | 1.4 | 6.0 | 300 | 12 | |

Remark)
−Δw: change in mass by heating

EXAMPLE 12

In Example 9, 100 parts by weight of fluorinated oligomer having COOH groups at both ends obtained in Example 8 was used, and heating conditions were changed as shown in the following Table 4. Results as shown in the following Table 4 were obtained.

TABLE 4

| Epoxy resin (parts by weight) | Gellation time (min.) | Heating conditions | 100% modulus (MPa) | Tensile strength (MPa) | Elongation (%) | Elongational strain (%) | −Δw |
|---|---|---|---|---|---|---|---|
| 9.3 | 10 | 130° C. for 1 hr −130° C. for 1 hr | 2.5 | 6.4 | 150 | 5 | |
| | | 130° C. for 1 hr −150° C. for 5 hrs | | | | | |
| | | 130° C. for 1 hr −200° C. for 5 hrs | | | | | |
| 9.0 | 10 | 130° C. for 1 hr −130° C. for 1 hr | 1.8 | 4.6 | 140 | 5 | |
| | | 130° C. for 1 hr −150° C. for 5 hrs | 3.2 | 4.7 | 145 | 5 | 0.2 |
| | | 130° C. for 1 hr −200° C. for 5 hrs | 4.2 | 6.3 | 130 | 0 | 0.7 |
| 7.1 | 10 | 130° C. for 1 hr −130° C. for 1 hr | 1.2 | 3.5 | 200 | 3 | |
| | | 130° C. for 1 hr −150° C. for 5 hrs | 1.6 | 4.6 | 165 | 5 | 0.24 |
| | | 130° C. for 1 hr −200° C. for 5 hrs | 2.9 | 5.8 | 135 | 0 | 0.79 |
| 11.0 | 5 | 130° C. for 1 hr −130° C. for 1 hr | 3.2 | 6.5 | 145 | 5 | |
| | | 130° C. for 1 hr −150° C. for 5 hrs | 3.8 | 6.8 | 150 | 5 | 0.17 |
| | | 130° C. for 1 hr −200° C. for 5 hrs | 5.6 | 8.7 | 135 | 0 | 0.65 |
| 15.2 | 4 | 130° C. for 1 hr −130° C. for 1 hr | 5.2 | 8.4 | 130 | 5 | |
| | | 130° C. for 1 hr −150° C. for 5 hrs | 6.4 | 8.6 | 130 | 5 | 0.13 |
| | | 130° C. for 1 hr −200° C. for 5 hrs | 7.6 | 8.8 | 115 | 0 | 0.48 |

EXAMPLE 13

In Example 12, Yuka-Shell epoxy product E-152 (epoxy equivalent weight: 175), E-828 (epoxy equivalent weight: 195) or E-604 (epoxy equivalent weight: 120) was used as epoxy resin in addition to the Yuka-Shell epoxy product E-154, and results as shown in the following Table 5 were obtained.

TABLE 5

| Epoxy resin (parts by weight) | Gellation time (min.) | Heating conditions | 100% modulus (MPa) | Tensile strength (MPa) | Elongation (%) | Elongational strain (%) | −Δw |
|---|---|---|---|---|---|---|---|
| E-154 (11.0) | 5 | 130° C. for 1 hr −130° C. for 1 hr | 2.7 | 5.2 | 140 | 0 | |
| | | 130° C. for 1 hr −150° C. for 5 hrs | 4.1 | 8.2 | 120 | 5 | 0.57 |
| | | 130° C. for 1 hr −200° C. for 5 hrs | 3.9 | 7.1 | 120 | 5 | 3.6 |
| E-152 (11.0) | 10 | 130° C. for 1 hr −130° C. for 1 hr | 2.1 | 5.8 | 180 | 5 | |
| | | 130° C. for 1 hr −150° C. for 5 hrs | 4.0 | 8.4 | 135 | 5 | 0.62 |
| | | 130° C. for 1 hr −200° C. for 5 hrs | 2.9 | 7.3 | 150 | 5 | 3.8 |
| E-828 (12.0) | 15 | 130° C. for 1 hr −130° C. for 1 hr | 2.1 | 5.0 | 175 | 3 | |
| | | 130° C. for 1 hr −150° C. for 5 hrs | 3.3 | 8.2 | 160 | 5 | 0.60 |
| | | 130° C. for 1 hr −200° C. for 5 hrs | 2.6 | 7.7 | 160 | 5 | 3.9 |
| E-604 (7.4) | 10 | 130° C. for 1 hr −130° C. for 1 hr | 2.5 | 9.8 | 280 | 7 | |
| | | 130° C. for 1 hr −150° C. for 5 hrs | 3.2 | 5.8 | 130 | 5 | 2.5 |
| | | 130° C. for 1 hr −200° C. for 5 hrs | | (swollen) | | | 14.0 |

EXAMPLE 14

In Example 12, various epoxy resins were used, and the curing products were subjected to n-hexane or ethanol dipping test at room temperature for 7 days or 30 days to determine percent swelling (unit: %). The results are shown in the following Table 6.

TABLE 6

| Epoxy resin | n-Hexane | | Ethanol | |
|---|---|---|---|---|
| (Parts by weight) | 7 days | 30 days | 7 days | 30 days |
| E-154 (7) | 0.5 | 1.0 | 16 | (collapsed) |
| E-154 (9) | 0.4 | 0.9 | 18 | 10 |
| E-154 (11) | 0.3 | 0.7 | 16 | 10 |
| E-154 (15) | 0.3 | 0.6 | 14 | 10 |
| E-154 (11) | 0.3 | 0.7 | 15 | 15 |
| E-152 (11) | 0.3 | 0.8 | 19 | 17 |

TABLE 6-continued

| Epoxy resin | n-Hexane | | Ethanol | |
|---|---|---|---|---|
| (Parts by weight) | 7 days | 30 days | 7 days | 30 days |
| E-828 (12) | 0.4 | 0.8 | 23 | 13 |
| E-604 (7.4) | 0.3 | 0.6 | 20 | (collapsed) |

EXAMPLE 15

In Example 12, various epoxy resins were used and the curing products obtained at 130° C. for one hour −130° C. for one hour was dipped into water at 100° C. for 3 hours, and changes in the vulcanization physical properties before and after the dipping were measured. Results as shown in the following Table 7 were obtained.

TABLE 7

| Epoxy resin (parts by weight) | 100% modulus (MPa.) | Tensile strength (MPa) | Elongation (%) | Elongational strain (%) | −Δw |
|---|---|---|---|---|---|
| Before dipping | | | | | |
| E-154 (11) | 2.7 | 5.2 | 140 | 0 | |
| E-152 (11) | 2.1 | 5.8 | 180 | 5 | |
| E-828 (12) | 2.1 | 5.0 | 175 | 3 | |
| E-604 (7.4) | 2.5 | 9.8 | 280 | 7 | |
| After dipping | | | | | |
| E-154 (11) | 0.4 | 1.7 | 265 | 20 | 1.3 |
| E-152 (11) | 0.3 | 1.7 | 475 | 75 | 1.3 |
| E-828 (12) | 0.4 | 1.6 | 570 | 135 | 1.3 |
| E-604 (7.4) | (collapsed) | | | | |

What is claimed is:

1. A process for producing a fluorinated oligomer having COOH groups at both ends, which comprises swelling a fluorine rubber crosslinked product in an organic solvent, followed by decomposition in the presence of a base and a peroxide.

2. A process according to claim 1, wherein the fluorine rubber crosslinked product is a polyol-, amine- or peroxide-vulcanized molding product.

3. A process according to claim 1, wherein the fluorine rubber crosslinked product to be decomposed is flushes, scraps or molding failures resulting from vulcanization molding of fluorine rubber.

4. A process according to claim 1, wherein the swelling in an organic solvent and the decomposition are carried out in the presence of a phase transfer catalyst.

5. A process according to claim 4, wherein the phase transfer catalyst is a quaternary onium salt.

6. A process according to claim 1, wherein the base is a hydroxide, a carbonate or an organic acid salt of alkali metal, or a tertiary amine or a tertiary phosphine.

7. A process according to claim 1, wherein the peroxide is $H_2O_2$, a persulfate, peracetic acid, an organic peroxide or organic hydroperoxide.

8. A process according to claim 1, wherein the peroxide and the base is added in the order of the peroxide to the base.

9. A process according to claim 1, wherein a reaction product resulting from the decomposition is phase separated by strong hydrochloric acid, a rough filler component is at first separated through a filter and washed with a washing solution, the resulting washing solution, together with the filtrate, is added to a large amount of water to conduct precipitation, followed by vigorous stirring for a long time, thereby conducting reprecipitation, and the resulting oily substances are spread and dried by heating, thereby obtaining an oily viscous liquid as a desired product.

* * * * *

UNITED STATES PATENT AND TRADEMARK OFFICE
CERTIFICATE OF CORRECTION

PATENT NO. : 6,174,928 B1
DATED : January 16, 2001
INVENTOR(S) : FUMIYO MIZUIDE ET AL.

It is certified that error appears in the above-identified patent and that said Letters Patent are hereby corrected as shown below:

In the Abstract, line 2, change "ρ" to -- η --

In the Specification, Column 2, Line 5, change "ρ" to -- η --

In the Specification, Column 4, Line 25, change "ρ" to -- η --

Signed and Sealed this

Fifteenth Day of May, 2001

Attest:

NICHOLAS P. GODICI

Attesting Officer     Acting Director of the United States Patent and Trademark Office